United States Patent
Mukherjee et al.

(10) Patent No.: US 12,307,420 B2
(45) Date of Patent: May 20, 2025

(54) METHOD AND SYSTEM FOR FACILITATING PLANOGRAM COMPLIANCE FOR INVENTORY MANAGEMENT

(71) Applicant: Tata Consultancy Services Limited, Mumbai (IN)

(72) Inventors: Jayanta Mukherjee, Kolkata (IN); Rahul Das, Kolkata (IN); Biswanath Pati, Bhubaneswar (IN); Aravind Selvaraj, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 233 days.

(21) Appl. No.: 18/209,646

(22) Filed: Jun. 14, 2023

(65) Prior Publication Data

US 2023/0410038 A1 Dec. 21, 2023

(30) Foreign Application Priority Data

Jun. 16, 2022 (IN) .............................. 202221034618

(51) Int. Cl.
*G06Q 10/087* (2023.01)
*G06Q 10/067* (2023.01)
*G06V 10/82* (2022.01)

(52) U.S. Cl.
CPC ......... *G06Q 10/087* (2013.01); *G06Q 10/067* (2013.01); *G06V 10/82* (2022.01)

(58) Field of Classification Search
None
See application file for complete search history.

(56) References Cited

U.S. PATENT DOCUMENTS 9,443,164 B2    9/2016  Sulc et al.
9,984,451 B2 *  5/2018  Gormish ................. G06F 18/22
(Continued)

FOREIGN PATENT DOCUMENTS

AU      2020205301 A1      2/2021
WO   WO-2017083424 A1 *   5/2017   .......... G05D 1/0212
WO   WO-2020023798 A1 *   1/2020   .............. G06N 3/04

OTHER PUBLICATIONS

Liu et al., "Planogram Compliance Checking Based on Detection of Recurring Patterns," (2016).

*Primary Examiner* — Ariel J Yu
(74) *Attorney, Agent, or Firm* — Finnegan, Henderson, Farabow, Garrett & Dunner, LLP

(57) ABSTRACT

Planograms are used to create consistency between store locations, to provide proper shelf space allocation, to improve visual merchandising appeal, and to create product-pairing suggestions. Existing solutions do not have a way to accurately estimate the scale of magnification of the object in the shelf image, so unable to distinguish between size variants of the same product. A system and method for facilitating planogram compliance for inventory management in a retail store have been provided. The scales are calculated with use of a vector convergence technique followed by a center clustering which automatically removes outliers. Initially disclosure comprises calculation of scales and centers, then generation of region proposals using those scales and centers, Next, classification of the regions proposed and generation of similarity scores, and on the basis of similarity scores conflict resolution is performed among overlapped region proposals using non-maximal suppression.

20 Claims, 9 Drawing Sheets

(56) References Cited

U.S. PATENT DOCUMENTS

| | | |
|---|---|---|
| 2016/0155011 A1* | 6/2016 | Sulc ................... G06V 10/757 |
| | | 382/103 |
| 2016/0171707 A1* | 6/2016 | Schwartz ............... G06F 18/22 |
| | | 382/180 |
| 2017/0178060 A1 | 6/2017 | Schwartz |
| 2017/0178061 A1* | 6/2017 | Griffin ................ G06Q 10/087 |
| 2017/0178227 A1* | 6/2017 | Graham ............. G06Q 30/0643 |
| 2018/0300043 A1* | 10/2018 | Graham ................ G06V 10/42 |
| 2019/0156276 A1* | 5/2019 | Fisher ................... G06V 10/82 |
| 2020/0013007 A1 | 1/2020 | Bogolea et al. |

\* cited by examiner

METHOD AND SYSTEM FOR FACILITATING PLANOGRAM COMPLIANCE FOR INVENTORY MANAGEMENT

PRIORITY CLAIM

This U.S. patent application claims priority under 35 U.S.C. § 119 to: Indian Patent Application No. 202221034618, filed on Jun. 16, 2022. The entire contents of the aforementioned application are incorporated herein by reference.

TECHNICAL FIELD

The disclosure herein generally relates to the field of retail inventory management, and, more particularly, to a method and system for facilitating planogram compliance for inventory management in a retail store.

BACKGROUND

In a retail store, the products should be arranged on shelves in such a way that a customer is effortlessly able to identify the products as per his/her convenience. Various smart methods have been used to arrange the products on the shelves. However, the integration of such skills in a smart machine vision system poses various challenges. In the current arrangement, a product detection system is in use for continuous monitoring of the arrangement of products on the shelves, checking compliance of a planogram, estimating out-of-stock products, enhancing the value-added service to the consumer and assisting visually impaired shoppers.

The planogram is a visual plan, which designates the placement of products on shelves and merchandising display fixtures of a retail store. Planograms are used to create consistency between store locations, to provide proper shelf space allocation, to improve visual merchandising appeal, and to create product-pairing suggestions. There are a few assumptions, considering one instance per product class is available beforehand and aspect ratio of the physical objects are maintained in the corresponding product templates. It is also assumed that all object instances in the target shelf images are in upright position, not tilted or rotated. In absence of any reference to the size of the products, it is a challenging task to calculate the proper scale and generate minimal number of region proposals.

The detection of products in a supermarket is an example where a single marketing image, also referred as template image, of a product is usually captured in a controlled studio-like environment. On the contrary, the images of the shelves are clicked in an uncontrolled retail store environment. Thus, the quality, illumination and resolution of the shelf image differs from those of the marketing image of the product. This poses an important challenge in detecting products. The recognition of hundreds of similar yet non-identical (fine-grained) products is yet another challenge. Another challenge is to identify among different package sizes of the same product, as the scale of magnification remains unknown.

SUMMARY

Embodiments of the present disclosure present technological improvements as solutions to one or more of the above-mentioned technical problems recognized by the inventors in conventional systems. For example, in one embodiment, a system for facilitating compliance in a retail store with respect to planograms, the system comprises a user interface, one or more hardware processors and a memory. The user interface receives a plurality of images for each product present in the retail store, wherein the plurality of images is stored in an inventory. The memory is in communication with the one or more hardware processors, wherein the one or more first hardware processors are configured to execute programmed instructions stored in the one or more first memories, to: transform the plurality of images to create a plurality of augmented images, wherein the transformation comprises a photometric transformation and a geometric transformation; train a model using the plurality of images and a plurality of augmented images; provide a target image and a query image, wherein the target image is captured by a user from a shelf in the retail store and the query image is taken from the inventory; extract a plurality of feature points from the target image and the query image using a feature extraction method; match the plurality of feature points from the target image and the query image to get a set of matching pairs on the basis of a similarity score; calculate a center and a scale for each pair of the set of matching pairs; generate region proposals for each pair using a set of centers and the corresponding scales, wherein the set of centers are identified using points where a large number of centers are clustered based on a threshold; calculate a classifier similarity score by classifying the generated region proposals using the trained model; identify overlaps among all the generated regions proposals, wherein the overlap is measured by an intersection area over a union (IOU) of two adjacent region proposals which are above a threshold; identify a single region for every detected overlaps using non-maximal suppression (NMS), wherein the identified single region is indicative of the detected products and their respective bounding boxes; collate all the single regions for all query images to get a realogram; and compare the realogram with the planogram to generate a planogram compliance report indicative of the planogram compliance for inventory management in the retail store.

In another aspect, a method for identifying relevant changes for facilitating planogram compliance for inventory management in a retail store is provided. Initially, a plurality of images is received for each product present in the retail store, wherein the plurality of images is stored in an inventory. The plurality of images is then transformed to create a plurality of augmented images, wherein the transformation comprises a photometric transformation and a geometric transformation. Further a model is trained using the plurality of images and a plurality of augmented images. In the next step, a target image and a query image are provided, wherein the target image is captured by a user from a shelf in the retail store and the query image is taken from the inventory. Further, a plurality of feature points is extracted from the target image and the query image using a feature extraction method. The plurality of feature points from the target image and the query image are then matched to get a set of matching pairs on the basis of a similarity score. In the next step, a center and a scale for each pair of the set of matching pairs are calculated. Further, region proposals are generated for each pair using a set of centers and the corresponding scales, wherein the set of centers are identified using points where a large number of centers are clustered based on a threshold. In the next step, a classifier similarity score is calculated by classifying the generated region proposals using the trained model. Further, overlaps are identified among all the generated regions proposals, wherein the overlap is measured by an intersection area over a union (IOU) of two adjacent region proposals which are above a threshold. Further, a single region is identified for every detected overlaps using non-maximal suppression (NMS), wherein the identified single region is indicative of the detected products and respective bounding boxes. In the next step, all the single regions are collated for all query images to get a realogram. And finally, the realogram is compared with the planogram to generate a planogram compliance report indicative of the planogram compliance for inventory management in the retail store.

In yet another aspect, one or more non-transitory machine-readable information storage mediums comprising one or more instructions which when executed by one or more hardware processors cause identifying relevant changes for facilitating planogram compliance for inventory management in a retail store. Initially, a plurality of images is received for each product present in the retail store, wherein the plurality of images is stored in an inventory. The plurality of images is then transformed to create a plurality of augmented images, wherein the transformation comprises a photometric transformation and a geometric transformation. Further a model is trained using the plurality of images and a plurality of augmented images. In the next step, a target image and a query image are provided, wherein the target image is captured by a user from a shelf in the retail store and the query image is taken from the inventory. Further, a plurality of feature points is extracted from the target image and the query image using a feature extraction method. The plurality of feature points from the target image and the query image are then matched to get a set of matching pairs on the basis of a similarity score. In the next step, a center and a scale for each pair of the set of matching pairs are calculated. Further, region proposals are generated for each pair using a set of centers and the corresponding scales, wherein the set of centers are identified using points where a large number of centers are clustered based on a threshold. In the next step, a classifier similarity score is calculated by classifying the generated region proposals using the trained model. Further, overlaps are identified among all the generated regions proposals, wherein the overlap is measured by an intersection area over a union (IOU) of two adjacent region proposals which are above a threshold. Further, a single region is identified for every detected overlaps using non-maximal suppression (NMS), wherein the identified single region is indicative of the detected products and respective bounding boxes. In the next step, all the single regions are collated for all query images to get a realogram. And finally, the realogram is compared with the planogram to generate a planogram compliance report indicative of the planogram compliance for inventory management in the retail store.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
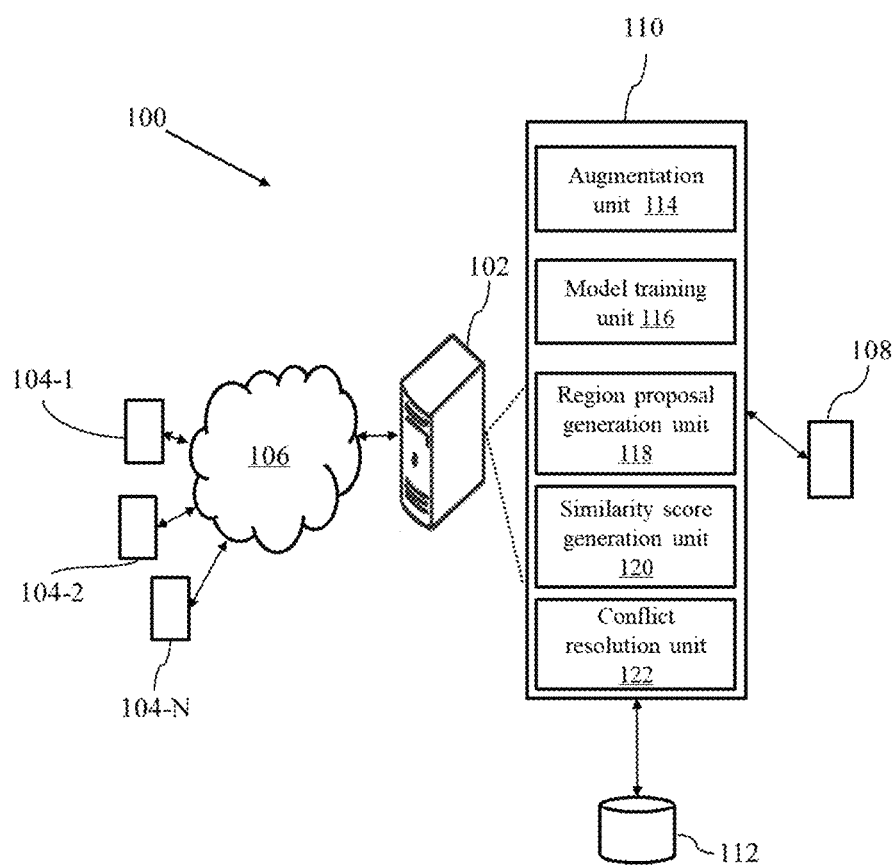
FIG. 1 shows a block diagram of a system for facilitating planogram compliance for inventory management in a retail store according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Planogram is a visual plan, which designates the placement of products on shelves and merchandising display fixtures of a retail store. Planograms are used to create consistency between store locations, to provide proper shelf space allocation, to improve visual merchandising appeal, and to create product-pairing suggestions. There are a few assumptions, considering one instance per product class is available beforehand and aspect ratio of the physical objects are maintained in the corresponding product templates. It is also assumed that all object instances in the target shelf images are in upright position, not tilted or rotated. In absence of any reference to the size of the products, it is a challenging task to calculate the proper scale and generate minimal number of region proposals.

Existing object instance detection solutions often identify background regions as products as it does not consider the product templates for identifying potential regions. Existing solutions do not have a way to accurately estimate the scale of magnification of the object in the shelf image, so unable to distinguish between size variants of the same product. Further, for removing ambiguous detection, the existing solution considers only a confidence score. In some solutions the potential regions are identified by moving rectangular regions of a different set of scales over the shelf, which is a time taking process and it does not consider the product templates. Furthermore, the existing solutions are incapable in identifying vertically stacked products.

In the earlier available methods regions estimated on the basis of a range of different scales. So, for a single instance there would be a large number of regions. So, in those methods for plurality of objects present in the target image, thousands of regions were to be proposed.

The present disclosure provides a system and method for facilitating planogram compliance for inventory management in a retail store. To be more specific, the system and method identifies various products on a plurality of images of various shelves of the retail store to facilitate compliance with respect to planograms. In the present disclosure the scales are calculated with use of a vector convergence technique followed by a center clustering which automatically removes outliers. The proposed disclosure provides three parts: 1. Calculation of scales and centers, then generation of region proposals using those scales and centers, 2. Classification of the regions proposed and generation of similarity scores, and 3. On the basis of similarity scores conflict resolution among overlapped region proposals using non-maximal suppression, where overlapping detected by thresholding intersection over union of region area values.

In the present disclosure propose a single region per object. So, if there are say m products, and the target image has n objects, then in best case there will be only n proposals, whereas in worst case there will be only m*n proposals. As the number of proposal comes down, the time for cropped image classification in aggregate also comes down. Thus, overall process performance is better than the methods that works with range of scales.

Referring now to the drawings, and more particularly to FIG. 1 through FIG. 8B, where similar reference characters denote corresponding features consistently throughout the figures, there are shown preferred embodiments and these embodiments are described in the context of the following exemplary system and/or method.

Figure 2:
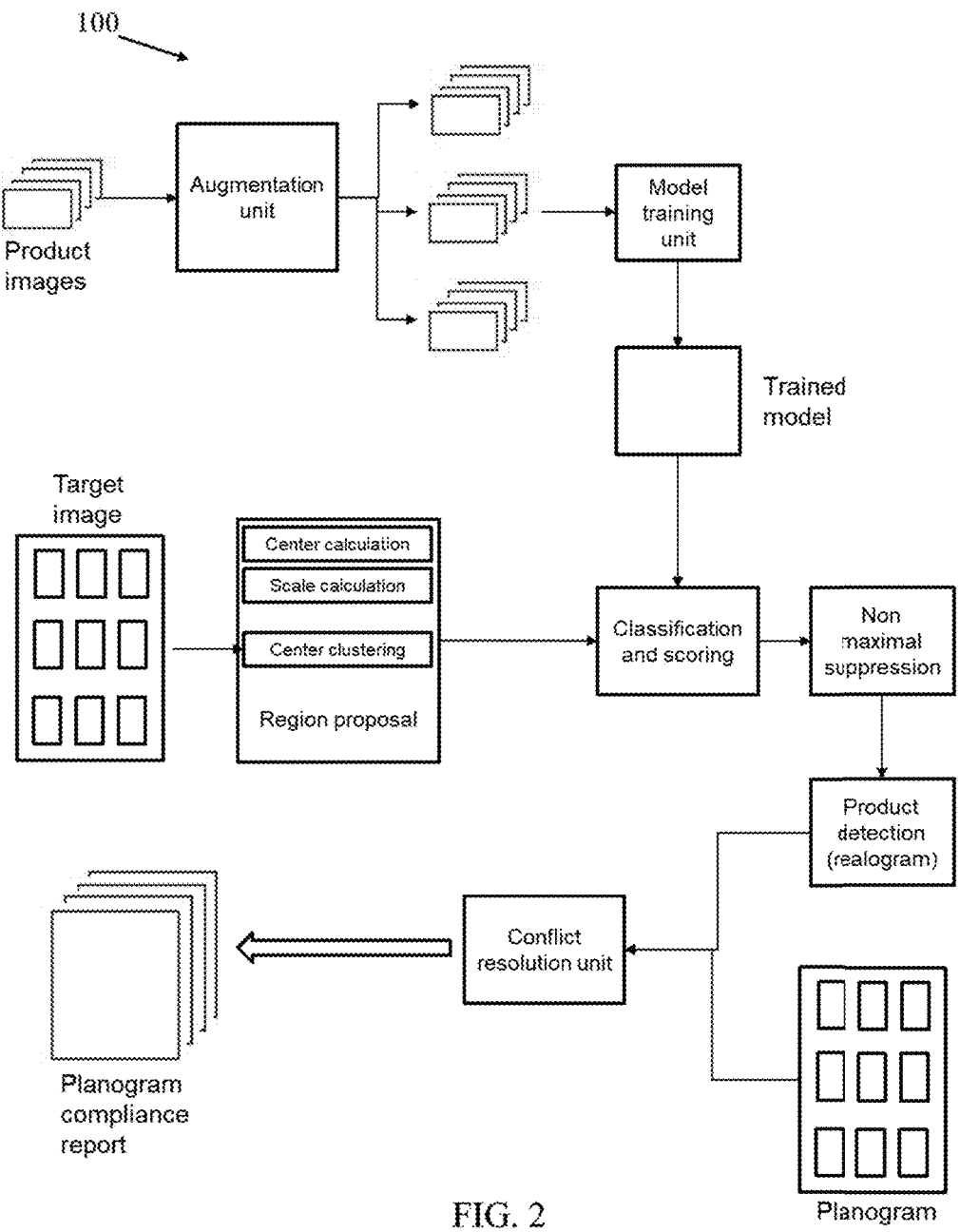
FIG. 2 shows schematic representation of the system of FIG. 1 for facilitating planogram compliance for inventory management in the retail store according to some embodiments of the present disclosure.

According to an embodiment of the disclosure, FIG. 1 illustrates a block diagram and FIG. 2 shows a schematic diagram of a system 100 for facilitating compliance in a retail store with respect to planograms. In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100. The memory 110 further comprises a plurality of units for performing various functions. The plurality of units comprises an augmentation unit 114, a model training unit 116, a region proposal generation unit 118, a similarity score generation unit 120, and a conflict resolution unit 122 as shown in the block diagram of FIG. 1.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

According to an embodiment of the disclosure, the system 100 is configured to receive a plurality of images for each product present in the retail store, wherein the plurality of images is stored in an inventory. The system 100 is also configured to receive, via the user interface 104, a target image and a query image, wherein the target image is captured by a user from a shelf in the retail store and the query image is taken from the inventory.

According to an embodiment of the disclosure, the system 100 comprises the augmentation unit 114. The augmentation unit 114 is configured to transform the plurality of images to create a plurality of augmented images. The transformation comprises a photometric transformation and a geometric transformation. For augmentation, the photometric transformations are done on the original product templates. The photometric transformations involve methods such as random contrast addition, random brightness adjustment, noise addition and blurring etc. Further, the geometric transformations involve methods such as rotation, translation, shearing and distortion.

According to an embodiment of the disclosure, the system 100 comprises the model training unit 116. The model training unit 116 is configured to train a model which is used for the classification. The model training unit 116 is configured to train the model using the plurality of images and the plurality of augmented images. The model is trained to support the classification of the cropped regions of the target image. In an example, an InceptionResNetV2 model is trained with the template images and their augmented copies.

According to an embodiment of the disclosure, the system 100 further comprises the region proposal generation unit 118. The region proposal generation unit 118 is configured to extract a plurality of feature points from the target image and the query image using a feature extraction method. The plurality of feature points from the target image and the query image are then matched to get a set of matching pairs on the basis of a similarity score. The region proposal generation unit 118 further configured to calculate a center and a scale for each pair of the set of matching pairs. The region proposal generation unit 118 further configured to generate, region proposals for each pair using a set of centers and the corresponding scales, wherein the set of centers are identified using points where a large number of centers are clustered based on a threshold. The process of generation of the region proposal is further explained below using mathematical equation.

Figure 3:
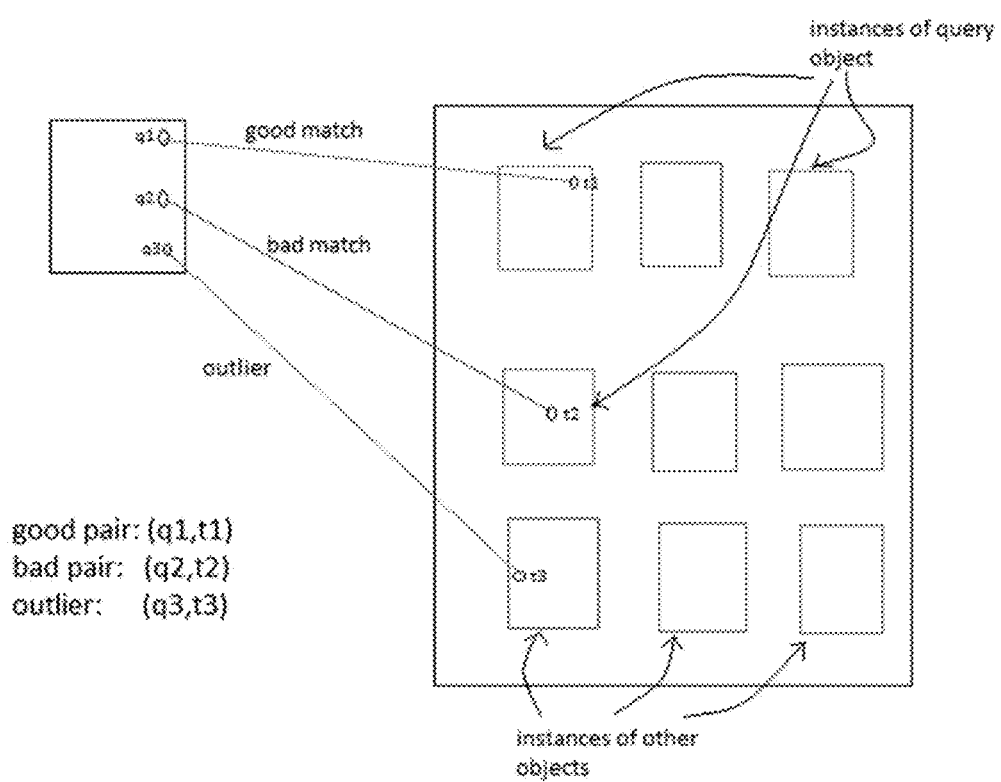
FIG. 3 shows an example of a good pair, a bad pair and an outlier according to some embodiments of the present disclosure.

The product template (query image) and the shelf image (target image) are matched on the basis of extracted feature points. A probable feature matches $\{q, t: q \in Q, t \in T\}$, are obtained, where Q and T are the set of all feature points from the query and the target image respectively. Any pair $(q, t)$ can be of following three categories: 1) A good pair, where a feature point from query image matched to a feature point in the target image belonging to the query object instance in the correct position. 2) A bad pair, where a feature point from query image matched to a feature point in the target image belonging to the query object instance but in the wrong position and 3) An outlier, where a feature point from query image matched to a feature point in the target image belonging to the background. FIG. 3 shows the examples of the three types of match pairs, the good pair (q1, t1), the bad pair (q2, t2) and the outlier (q3, t3). Let there are two matching pairs (q1, t1) and (q2, t2), where the coordinates of the points are as below:

$$\left.\begin{array}{l} q_1 = (x_{q_1}, y_{q_1}) \\ t_1 = (x_{t_1}, y_{t_1}) \\ q_2 = (x_{q_2}, y_{q_2}) \\ t_2 = (x_{t_2}, y_{t_2}) \end{array}\right\} \quad (1)$$

Let width and height of the query image are w and h respectively. If (q1, t1) is a good match pair and the unknown scale is s, then we can derive the center, say c, of the object instance on the target image, which has coordinates $(x_1^{cent}, y_1^{cent})$ as below:

$$\left.\begin{array}{l} x_1^{cent} = x_{t_1} - s\left(x_{q1} - \frac{w}{2}\right) \\ y_1^{cent} = y_{t_1} - s\left(y_{q1} - \frac{h}{2}\right) \end{array}\right\} \quad (2)$$

Figure 4:
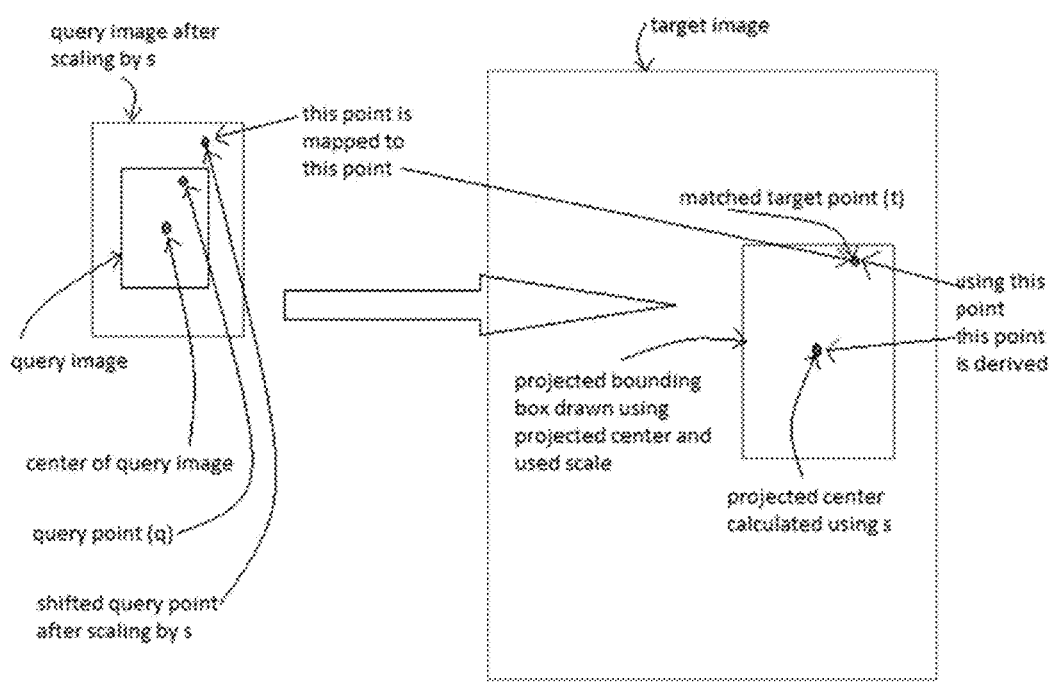
FIG. 4 shows schematic of transformation of the center from the query to the target image according to some embodiments of the present disclosure.
Figure 5:
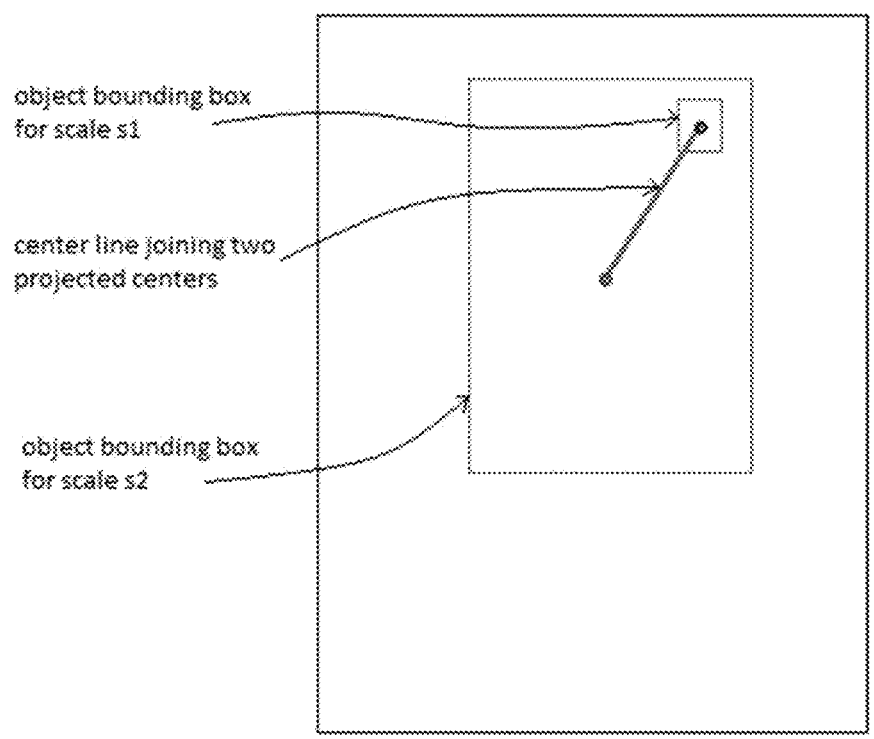
FIG. 5 shows an example of a straight line joining the projected centers with scales s1 and s2 according to some embodiments of the present disclosure.

FIG. 4 shows a projection of center onto the target image, given a good match and a scale. But the scale s is unknown. Different scales s1, s2, s3, etc. are tried at different projected locations of centers can be derived on the target image. It can be shown that all those centers lie on a straight line. So, straight line is derived as shown in FIG. 5, for sure the center with yet unknown actual scale lie on that straight line. Let's take two arbitrary scales s1 and s2, using those two centers c1 $(x_1^{cent1}, y_1^{cent1})$ and c2 $(x_1^{cent2}, y_1^{cent2})$ are obtained as shown in equation (3).

$$\left.\begin{array}{l} x_1^{cent1} = x_{t_1} - s_1\left(x_{q1} - \frac{w}{2}\right) \\ y_1^{cent1} = y_{t_1} - s_1\left(y_{q1} - \frac{h}{2}\right) \\ x_1^{cent2} = x_{t_1} - s_2\left(x_{q1} - \frac{w}{2}\right) \\ y_1^{cent2} = y_{t_1} - s_2\left(y_{q1} - \frac{h}{2}\right) \end{array}\right\} \quad (3)$$

Using the points c1 and c2 the equation of the straight line in y=a*x+b form is obtained. Where a and b can be derived as below in equation (4):

$$\left.\begin{array}{l} a_1 = \dfrac{y_1^{cent2} - y_1^{cent1}}{x_1^{cent2} - x_1^{cent1}} \\ b_1 = y_1^{cent2} - a_1 x_1^{cent2} \end{array}\right\} \quad (4)$$

Simplification of the equation (4) is shown below set of equations:

$$y_1^{cent2} - y_1^{cent1} = y_{t_1} - s_2\left(y_{q_1} - \frac{h}{2}\right) - y_{t_1} + s_1\left(y_{q_1} - \frac{h}{2}\right)$$

$$= (s_1 - s_2)\left(y_{q_1} - \frac{h}{2}\right)$$

$$x_1^{cent2} - x_1^{cent1} = x_{t_1} - s_2\left(x_{q_1} - \frac{w}{2}\right) - x_{t_1} + s_1\left(x_{q_1} - \frac{w}{2}\right)$$

$$= (s_1 - s_2)\left(x_{q_1} - \frac{w}{2}\right)$$

$$\therefore a_1 = \frac{y_{q_1} - \frac{h}{2}}{x_{q_1} - \frac{w}{2}}$$

$$b_1 = y_1^{cent2} - a_1 x_1^{cent2}$$

$$= y_{t_1} - s_2\left(y_{q_1} - \frac{h}{2}\right) - \frac{y_{q_1} - \frac{h}{2}}{x_{q_1} - \frac{w}{2}}\left\{x_{t_1} - s_2\left(x_{q_1} - \frac{w}{2}\right)\right\}$$

$$= y_{t_1} - \frac{s_2\left(y_{q_1} - \frac{h}{2}\right)\left(x_{q_1} - \frac{w}{2}\right) - s_2\left(y_{q_1} - \frac{h}{2}\right)\left(x_{q_1} - \frac{w}{2}\right) + x_{t_1}\left(y_{q_1} - \frac{h}{2}\right)}{x_{q_1} - \frac{w}{2}}$$

$$= y_{t_1} - x_{t_1}\frac{y_{q_1} - \frac{h}{2}}{x_{q_1} - \frac{w}{2}}$$

$$\therefore b_1 = y_{t_1} - x_{t_1}\frac{y_{q_1} - \frac{h}{2}}{x_{q_1} - \frac{w}{2}}$$

By simplification it can show that a and b can be re-written as below in equation (5):

$$\left.\begin{array}{l} a_1 = \dfrac{y_{q_1} - \frac{h}{2}}{x_{q_1} - \frac{w}{2}} \\ b_1 = y_{t_1} - x_{t_1}\dfrac{y_{q_1} - \frac{h}{2}}{x_{q_1} - \frac{w}{2}} \end{array}\right\} \quad (5)$$

If both (q1, t1) and (q2, t2) are good match pairs and belong to the same instance of the query object on the target image, then centers derived for each pair superpose on the target image. It can be concluded, the center lines derived for (q1, t1) and (q2, t2) should intersect each other on the actual center and corresponding scale will be the actual scale using the straight lines derived for (q1, t1) and (q2, t2), say (a1, b1) and (a2, b2) respectively. The point of intersection p (x, y) is derived as below:

$$\left.\begin{array}{l} x = -\dfrac{b_1 - b_2}{a_1 - a_2} \\ y = -a_1\dfrac{b_1 - b_2}{a_1 - a_2} + b_1 \end{array}\right\} \quad (6)$$

-continued where, $$a_1 = \frac{y_{q_1} - \frac{h}{2}}{x_{q_1} - \frac{w}{2}} \quad (7)$$

$$b_1 = y_{t_1} - x_{t_1} \frac{y_{q_1} - \frac{h}{2}}{x_{q_1} - \frac{w}{2}}$$

$$a_2 = \frac{y_{q_2} - \frac{h}{2}}{x_{q_2} - \frac{w}{2}}$$

$$b_2 = y_{t_2} - x_{t_2} \frac{y_{q_2} - \frac{h}{2}}{x_{q_2} - \frac{w}{2}}$$

here the equation of center does not contain s1 and s2. With s1 and s2 the actual scale can be derived using the center coordinates. The value of s is interpolated as follows:

$$s = s_1 + (s_2 - s_1)\frac{d(c_1, p)}{d(c_1, c_2)} \quad (8)$$

where d is the Euclidean distance between two points.

$$d(c_1, c_2) = \sqrt{\left\{\left(x_{t_1} - s_1\left(x_{q_1} - \frac{w}{2}\right)\right) - \left(x_{t_1} - s_2\left(x_{q_1} - \frac{w}{2}\right)\right)\right\}^2 + \left\{\left(y_{t_1} - s_1\left(y_{q_1} - \frac{h}{2}\right)\right) - \left(y_{t_1} - s_2\left(y_{q_1} - \frac{h}{2}\right)\right)\right\}^2}$$

$$= \sqrt{\left\{(s_2 - s_1)\left(x_{q_1} - \frac{w}{2}\right)\right\}^2 + \left\{(s_2 - s_1)\left(y_{q_1} - \frac{h}{2}\right)\right\}^2}$$

$$= (s_2 - s_1)\sqrt{\left(x_{q_1} - \frac{w}{2}\right)^2 + \left(y_{q_1} - \frac{h}{2}\right)^2}$$

$$d(c_1, p) = \sqrt{\left(x_{t_1} - s_1\left(x_{q_1} - \frac{w}{2}\right) - x\right)^2 + \left(y_{t_1} - s_1\left(y_{q_1} - \frac{h}{2}\right) - y\right)^2}$$

So, the equation for s simplifies to:

$$s = s_1 + \frac{\sqrt{\left(x_{t_1} - s_1\left(x_{q_1} - \frac{w}{2}\right) - x\right)^2 + \left(y_{t_1} - s_1\left(y_{q_1} - \frac{h}{2}\right) - y\right)^2}}{\sqrt{\left(x_{q_1} - \frac{w}{2}\right)^2 + \left(y_{q_1} - \frac{h}{2}\right)^2}}$$

Since s1 should be chosen as small as possible, value of s can be derived when s1 tends to zero:

$$s = \frac{\sqrt{(x_{t_1} - x)^2 + (y_{t_1} - y)^2}}{\sqrt{\left(x_{q_1} - \frac{w}{2}\right)^2 + \left(y_{q_1} - \frac{h}{2}\right)^2}} \quad (9)$$

So, for any valid couple of match pairs the center and scale of an instance of the query object on target image is obtained, using the following set of equations:

$$a_1 = \frac{y_{q_1} - \frac{h}{2}}{x_{q_1} - \frac{w}{2}} \quad (10)$$

$$b_1 = y_{t_1} - x_{t_1} \frac{y_{q_1} - \frac{h}{2}}{x_{q_1} - \frac{w}{2}}$$

$$a_2 = \frac{y_{q_2} - \frac{h}{2}}{x_{q_2} - \frac{w}{2}}$$

$$b_2 = y_{t_2} - x_{t_2} \frac{y_{q_2} - \frac{h}{2}}{x_{q_2} - \frac{w}{2}}$$

$$x = -\frac{b_1 - b_2}{a_1 - a_2}$$

$$y = -a_1\frac{b_1 - b_2}{a_1 - a_2} + b_1$$

$$s = \frac{\sqrt{(x_{t_1} - x)^2 + (y_{t_1} - y)^2}}{\sqrt{\left(x_{q_1} - \frac{w}{2}\right)^2 + \left(y_{q_1} - \frac{h}{2}\right)^2}}$$

The above equations (10) are independent of s1 and s2. Using the above set of equations, the [x, y, s] triplets are calculated for all possible {q, t} pairs. Ideally if there are 'n' instances of the query object present in the target image, then centers calculated for all good pairs should concentrate on or around 'n' distinct points. Whereas centers calculated for bad matches and outliers should be scattered around.

Figure 6:
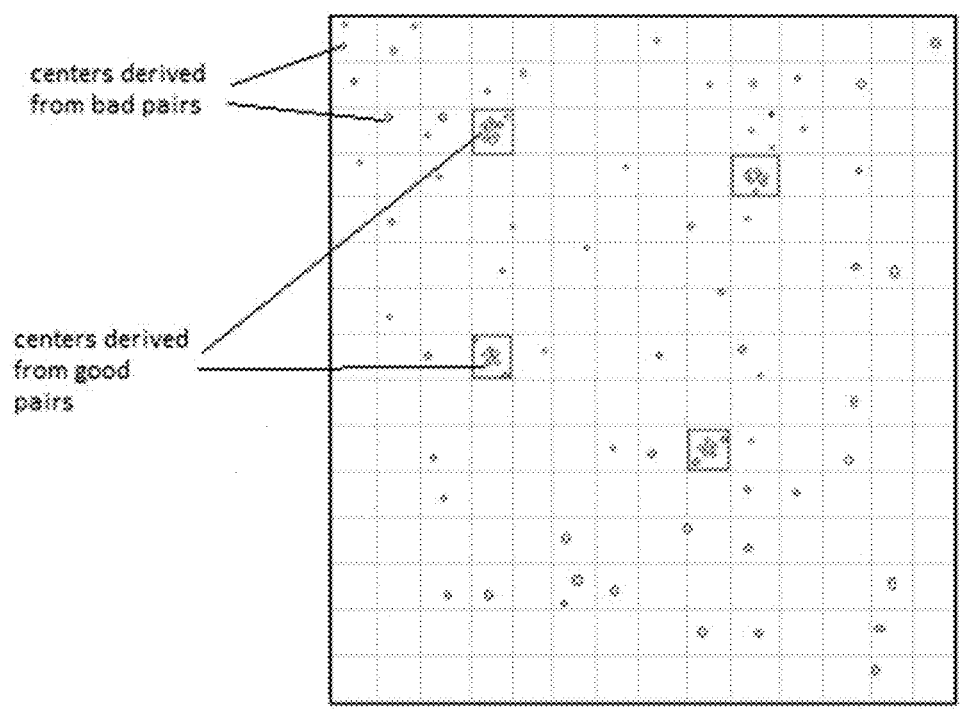
FIG. 6 shows clustering of calculated centers using grid according to some embodiments of the present disclosure.

Using thresholds, it can be found out the grids having large number of centers as shown in the example of FIG. 6 showing clustering of calculated centers using grid. The mode of corresponding scales is obtained within the grid and selected as the scale 'S' of that particular region proposal. Center of that proposal is calculated by averaging the center coordinates belonging to scale 'S' within that grid.

For all different product templates, the process of finding region proposals is repeated. So, output of this phase is the sets of region proposals for all the given products. Some of those proposals may overlap also, depending on the similarity of the product images.

According to an embodiment of the disclosure, the system 100 comprises the similarity score generation unit 120. The similarity score generation unit 120 is configured to calculate a classifier similarity score by classifying the generated region proposals using the trained model. The center clustering generates region proposals in form of bounding boxes. If multiple bounding boxes overlap, there is a need of some numerical value of such boxes, so that, based on that value we can choose a single proposal among the overlapping boxes. The center clustering does not provide any such numeric value, it only generated bounding boxes, with the information—for which product, this bounding box has been generated. So, there is a need to have an external mechanism for conflict resolution. The CNN classifier has been used for this reason. The classifier similarity score of the CNN classifier is the required numeric value. Based on the classifier similarity score the winner out of the overlapping bounding boxes is decided.

Figure 7:
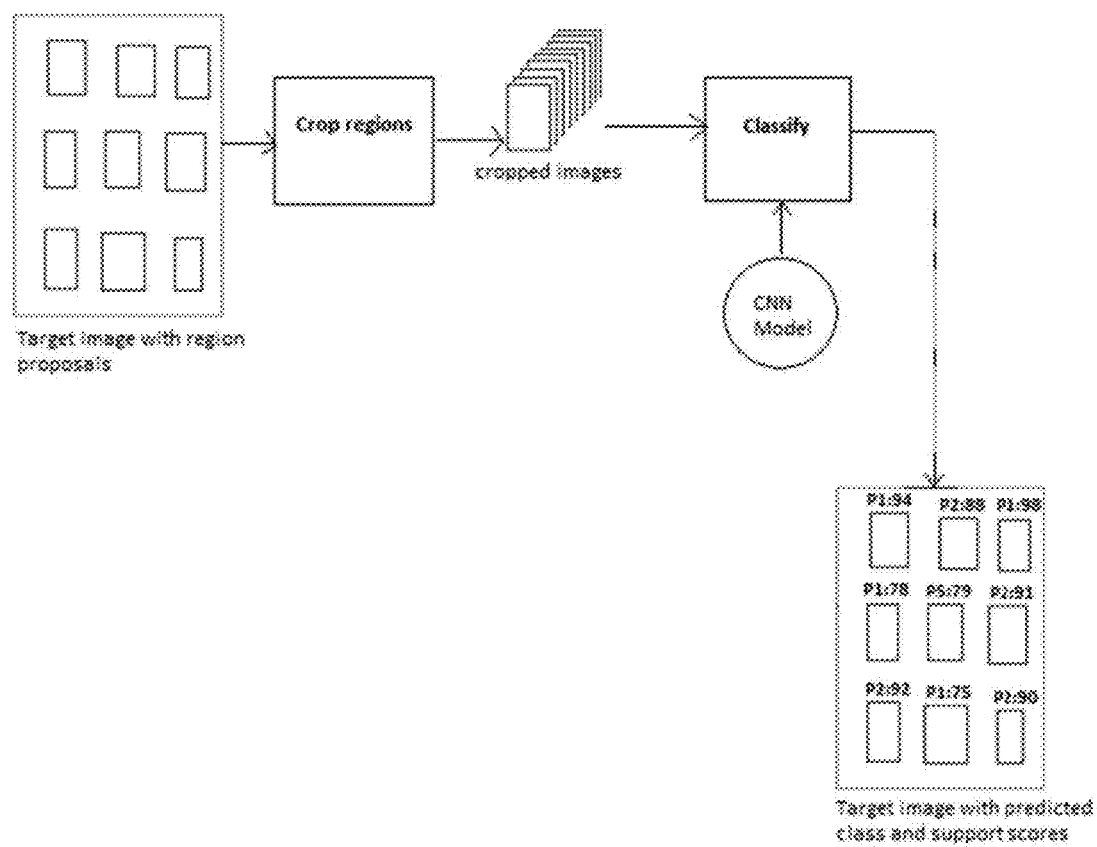
FIG. 7 shows schematic representation for classification of region proposal using CNN according to some embodiments of the present disclosure.

The Deep CNN classifier is trained with the product templates. Data augmentation is used to increase the volume of training data set. The proposed regions are then passed through the trained model that produce the class and support score of the region. Using the region proposals, the regions are cropped off from the target image. Then each of those cropped images passed through the trained Convolutional Neural Network (CNN) model. The CNN model produces the class predictions and prediction support scores for the cropped off images. FIG. 7 shows a schematic diagram for classification of region proposal using CNN.

According to an embodiment of the disclosure, the system 100 is further configured to identify overlaps among all the generated regions proposals, wherein the overlap is measured by an intersection area over a union (IOU) of two adjacent region proposals which are above a threshold.

According to an embodiment of the disclosure, the system 100 comprises the conflict resolution unit 122. The conflict resolution unit 122 is configured to identify a single region for every detected overlaps using non-maximal suppression (NMS), wherein the identified single region is indicative of the detected products and their respective bounding boxes. All the single regions are then collated for all query images to get a realogram. The conflict resolution unit 122 is further configured to compare the realogram with the planogram to generate a planogram compliance report indicative of the planogram compliance for inventory management in the retail store.

Wherever overlapping regions are found non-maximum suppression (NMS) is applied with the support scores. For all the region proposals using scales and centers adjacent regions are listed. When intersection area over the union (IOU) of the areas of two adjacent regions are above a certain threshold, it is considered to be overlapping regions. For overlapping regions, one region singled out which is having maximum similarity score. Out of the overlapping regions only a single maximal region is reported in the result. Thus, the final detection holds only non-overlapping regions with their detected class codes. As a final result non-overlapped bounding boxes with detected object class are produced. Corresponding scales are also reported, using which it is possible to detect size variants of a product, if multiple variants are present in the same shelf image.

Figure 8A:
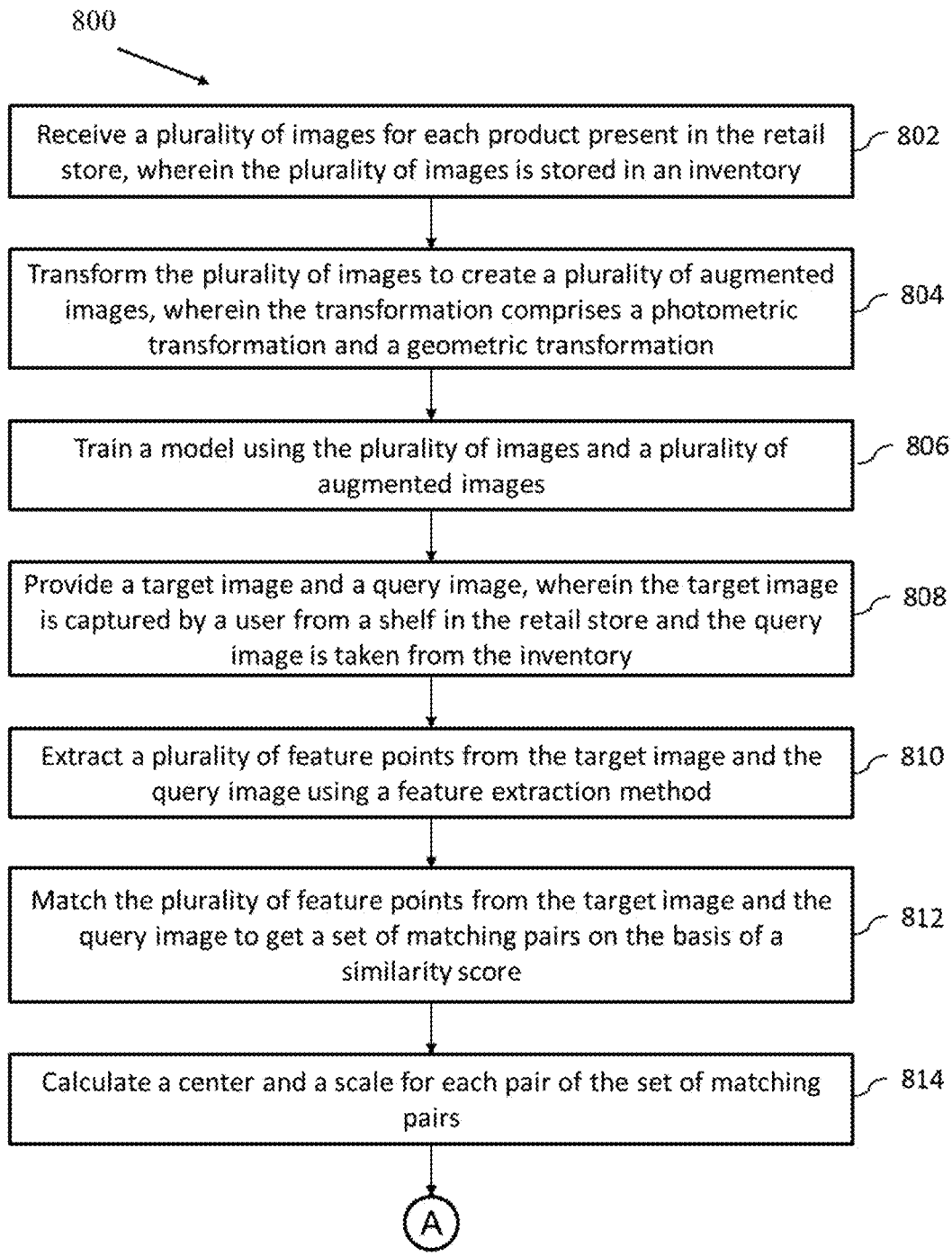
FIG. 8A-8B is a flowchart of a method for facilitating planogram compliance for inventory management in the retail store according to some embodiments of the present disclosure.
Figure 8B:
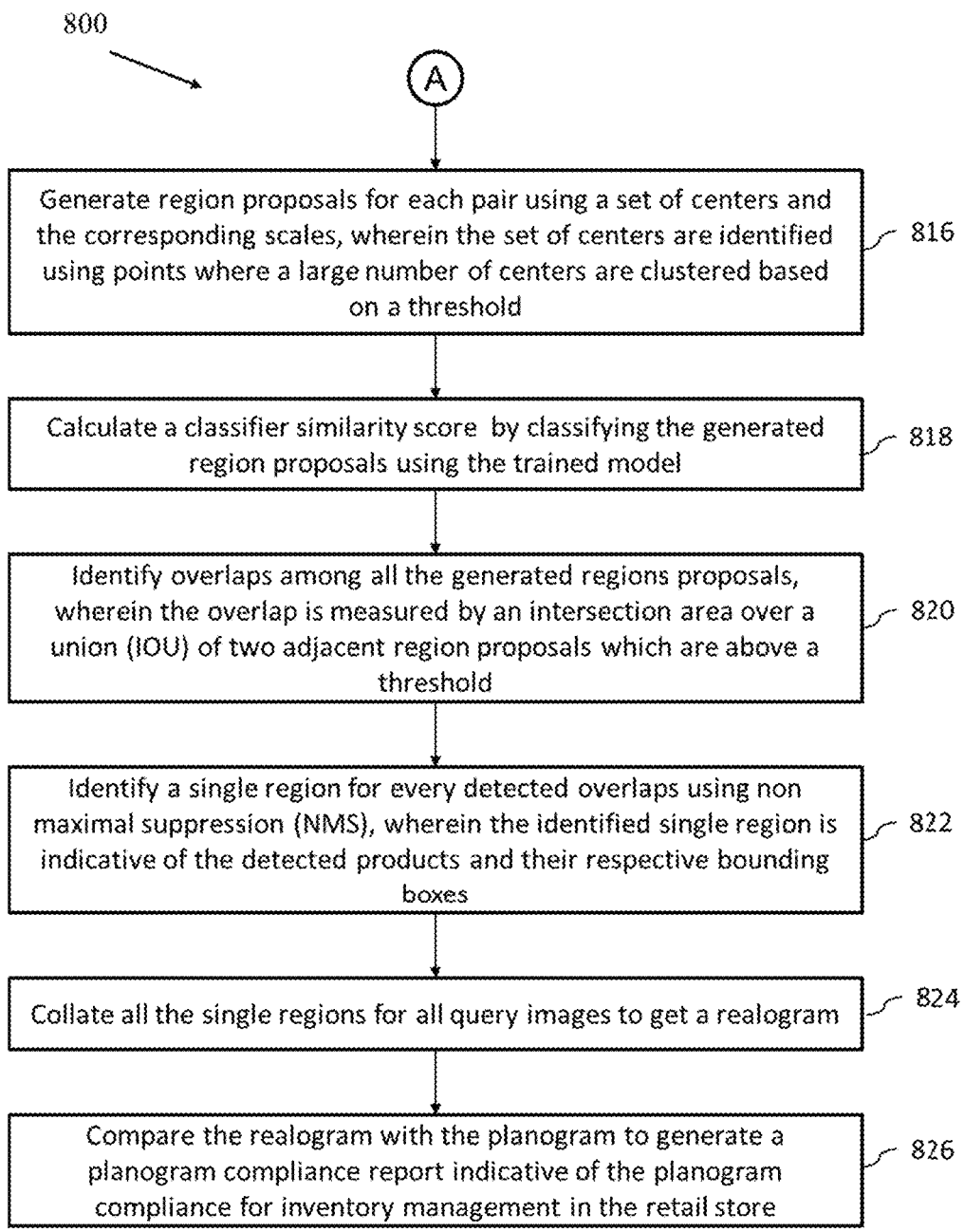

FIG. 8A-8B illustrates a flow chart of a method 800 for facilitating planogram compliance for inventory management in a retail store, in accordance with an example embodiment of the present disclosure. The method 800 depicted in the flow chart may be executed by a system, for example, the system 100 of FIG. 1. In an example embodiment, the system 100 may be embodied in the computing device.

Operations of the flowchart, and combinations of operations in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 800 are described with help of system 100. However, the operations of the method 800 can be described and/or practiced by using any other system.

Initially at step 802 of the method 800, the plurality of images for each product present in the retail store is provided, wherein the plurality of images is stored in the inventory or data repository 112. At step 804, the plurality of images is transformed to create the plurality of augmented images, wherein the transformation comprises a photometric transformation and a geometric transformation. The photometric transformation comprises random contrast addition, random brightness adjustment, noise addition and blurring. The geometric transformation comprises rotation, translation, shearing and distortion. Further at step 806, the model is trained using the plurality of images and the plurality of augmented images.

In the next step 808 of the method 800, the target image and the query image are provided. The target image is captured by the user from the shelf in the retail store and the query image is taken from the inventory. In the next step 810, the plurality of feature points is extracted from the target image and the query image using the feature extraction method. Further at step 812, the plurality of feature points from the target image and the query image is matched to get a set of matching pairs on the basis of a similarity score. The set of matching pairs comprises one of: a good pair, wherein the good pair is a pair where a feature point from the query image is matched to a feature point in the target image belonging to the query object instance in the correct position, a bad pair, wherein the bad pair is a pair where a feature point from query image matched to a feature point in the target image belonging to the query object instance but in a wrong position, and an outlier, wherein the outlier is a pair where a feature point from the query image matched to a feature point in the target image belonging to a background.

In the next step 814 of the method 800, the center and the scale for each pair of the set of matching pairs are calculated. At step 816, region proposals are generated for each pair using a set of centers and the corresponding scales, wherein the set of centers are identified using points where a large number of centers are clustered based on a threshold.

In the next step 818 of the method 800, the classifier similarity score is calculated by classifying the generated region proposals using the trained model. At step 820, Overlaps are then identified among all the generated regions proposals, wherein the overlap is measured by the intersection area over the union (IOU) of two adjacent region proposals which are above the threshold. Further at step 822, the single region for every detected overlaps are identified using non-maximal suppression (NMS), wherein the identified single region is indicative of the detected products and their respective bounding boxes.

Further at step 824 of the method 800, all the single regions for all query images are collated to get the realogram. Finally, at step 826, the realogram with the planogram to generate the planogram compliance report indicative of the planogram compliance for inventory management in the retail store.

According to an embodiment of the disclosure, using the scales calculated, proper sizes of the objects on the target image is determined. So, when multiple packaging of the same product with different package sizes, but having same look, can also be differentiated. Thus, the present disclosure solves the size variant problem.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem related to inventory management in a retail store such as maintaining products as per planogram etc. The embodiment thus provides a method and a system for facilitating planogram compliance for inventory management in a retail store.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for facilitating planogram compliance for inventory management in a retail store, the method comprising:

receiving, via one or more hardware processors, a plurality of images for each product present in the retail store, wherein the plurality of images is stored in an inventory;

transforming, via the one or more hardware processors, the plurality of images to create a plurality of augmented images, wherein the transformation comprises a photometric transformation and a geometric transformation;

training, via the one or more hardware processors, a model using the plurality of images and a plurality of augmented images;

providing, via the one or more hardware processors, a target image and a query image, wherein the target image is captured by a user from a shelf in the retail store and the query image is taken from the inventory;

extracting, via the one or more hardware processors, a plurality of feature points from the target image and the query image using a feature extraction method;

matching, via the one or more hardware processors, the plurality of feature points from the target image and the query image to get a set of matching pairs on the basis of a similarity score;

calculating, via the one or more hardware processors, a center and a scale for each pair of the set of matching pairs;

generating, via the one or more hardware processors, region proposals for each pair using a set of centers and the corresponding scales, wherein the set of centers are identified using points where a large number of centers are clustered based on a threshold;

calculating, via the one or more hardware processors, a classifier similarity score by classifying the generated region proposals using the trained model;

identifying, via the one or more hardware processors, overlaps among all the generated regions proposals, wherein the overlap is measured by an intersection area over a union (IOU) of two adjacent region proposals which are above a threshold;

identifying, via the one or more hardware processors, a single region for every detected overlaps using non-maximal suppression (NMS), wherein the identified single region is indicative of the detected products and respective bounding boxes;

collating, via the one or more hardware processors, all the single regions for all query images to get a realogram; and comparing, via the one or more hardware processors, the realogram with the planogram to generate a planogram compliance report indicative of the planogram compliance for inventory management in the retail store.

2. The processor implemented method of claim 1, wherein the photometric transformation comprises random contrast addition, random brightness adjustment, noise addition and blurring, and the geometric transformation comprises rotation, translation, shearing and distortion.

3. The processor implemented method of claim 1, wherein the set of matching pairs comprises one of:
   a good pair, wherein the good pair is a pair where a feature point from the query image matches to a feature point in the target image belonging to the query object instance in the correct position,
   a bad pair, wherein the bad pair is a pair where a feature point from query image matches to a feature point in the target image belonging to the query object instance but in a wrong position, and
   an outlier, wherein the outlier is a pair where a feature point from the query image matches to a feature point in the target image belonging to a background.

4. The processor implemented method of claim 1 further comprising finding a grid having a large number of centers using a center threshold.

5. The processor implemented method of claim 1, wherein the center of the region proposal is calculated by averaging the center coordinates belonging to scale within the grid.

6. The processor implemented method of claim 1, wherein the feature extraction method is Binary Robust Invariant Scalable key-points (BRISK) algorithm.

7. The processor implemented method of claim 1, wherein the trained model is a trained Convolutional Neural Network (CNN) model.

8. A system for facilitating compliance in a retail store with respect to planograms, the system comprises:
   a user interface for receiving a plurality of images for each product present in the retail store, wherein the plurality of images is stored in an inventory
   one or more hardware processors;
   a memory in communication with the one or more hardware processors, wherein the one or more first hardware processors are configured to execute programmed instructions stored in the one or more first memories, to:
      transform the plurality of images to create a plurality of augmented images, wherein the transformation comprises a photometric transformation and a geometric transformation;
      train a model using the plurality of images and a plurality of augmented images;
      provide a target image and a query image, wherein the target image is captured by a user from a shelf in the retail store and the query image is taken from the inventory;
      extract a plurality of feature points from the target image and the query image using a feature extraction method;
      match the plurality of feature points from the target image and the query image to get a set of matching pairs on the basis of a similarity score;
      calculate a center and a scale for each pair of the set of matching pairs;
      generate region proposals for each pair using a set of centers and the corresponding scales, wherein the set of centers are identified using points where a large number of centers are clustered based on a threshold;
      calculate a classifier similarity score by classifying the generated region proposals using the trained model;
      identify overlaps among all the generated regions proposals, wherein the overlap is measured by an intersection area over a union (IOU) of two adjacent region proposals which are above a threshold;
      identify a single region for every detected overlaps using non-maximal suppression (NMS), wherein the identified single region is indicative of the detected products and their respective bounding boxes;
      collate all the single regions for all query images to get a realogram; and
      compare the realogram with the planogram to generate a planogram compliance report indicative of the planogram compliance for inventory management in the retail store.

9. The system of claim 8, wherein
the photometric transformation comprises random contrast addition, random brightness adjustment, noise addition and blurring, and
the geometric transformation comprises rotation, translation, shearing and distortion.

10. The system of claim 8, wherein the set of matching pairs comprises one of:
   a good pair, wherein the good pair is a pair where a feature point from the query image matches to a feature point in the target image belonging to the query object instance in the correct position,
   a bad pair, wherein the bad pair is a pair where a feature point from query image matches to a feature point in the target image belonging to the query object instance but in a wrong position, and
   an outlier, wherein the outlier is a pair where a feature point from the query image matches to a feature point in the target image belonging to a background.

11. The system of claim 8 further configured to find a grid having a large number of centers using a center threshold.

12. The system of claim 8, wherein the center of the region proposal is calculated by averaging the center coordinates belonging to scale within the grid.

13. The system of claim 8, wherein the feature extraction method is Binary Robust Invariant Scalable key-points (BRISK) algorithm.

14. The system of claim 8, wherein the trained model is a trained Convolutional Neural Network (CNN) model.

15. One or more non-transitory machine-readable information storage mediums comprising one or more instructions which when executed by one or more hardware processors cause:
   receiving, a plurality of images for each product present in the retail store, wherein the plurality of images is stored in an inventory;
   transforming, the plurality of images to create a plurality of augmented images, wherein the transformation comprises a photometric transformation and a geometric transformation;
   training, a model using the plurality of images and a plurality of augmented images;
   providing, a target image and a query image, wherein the target image is captured by a user from a shelf in the retail store and the query image is taken from the inventory;

extracting, a plurality of feature points from the target image and the query image using a feature extraction method;

matching, the plurality of feature points from the target image and the query image to get a set of matching pairs on the basis of a similarity score;

calculating, a center and a scale for each pair of the set of matching pairs;

generating, region proposals for each pair using a set of centers and the corresponding scales, wherein the set of centers are identified using points where a large number of centers are clustered based on a threshold;

calculating, a classifier similarity score by classifying the generated region proposals using the trained model;

identifying, overlaps among all the generated regions proposals, wherein the overlap is measured by an intersection area over a union (IOU) of two adjacent region proposals which are above a threshold;

identifying, a single region for every detected overlaps using non-maximal suppression (NMS), wherein the identified single region is indicative of the detected products and respective bounding boxes;

collating, all the single regions for all query images to get a realogram; and comparing, the realogram with the planogram to generate a planogram compliance report indicative of the planogram compliance for inventory management in the retail store.

16. The one or more non-transitory machine-readable information storage mediums of claim 15, wherein
the photometric transformation comprises random contrast addition, random brightness adjustment, noise addition and blurring, and
the geometric transformation comprises rotation, translation, shearing and distortion.

17. The one or more non-transitory machine-readable information storage mediums of claim 15, wherein the set of matching pairs comprises one of:
a good pair, wherein the good pair is a pair where a feature point from the query image matches to a feature point in the target image belonging to the query object instance in the correct position,
a bad pair, wherein the bad pair is a pair where a feature point from query image matches to a feature point in the target image belonging to the query object instance but in a wrong position, and
an outlier, wherein the outlier is a pair where a feature point from the query image matches to a feature point in the target image belonging to a background.

18. The one or more non-transitory machine-readable information storage mediums of claim 15, wherein the one or more instructions which when executed by the one or more hardware processors further cause finding a grid having a large number of centers using a center threshold.

19. The one or more non-transitory machine-readable information storage mediums of claim 15, wherein the center of the region proposal is calculated by averaging the center coordinates belonging to scale within the grid.

20. The one or more non-transitory machine-readable information storage mediums of claim 15, wherein the feature extraction method is Binary Robust Invariant Scalable key-points (BRISK) algorithm.

* * * * *